United States Patent
Dölker

(10) Patent No.: US 12,546,264 B2
(45) Date of Patent: Feb. 10, 2026

(54) CONTROL DEVICE FOR CONTROLLING A POWER ASSEMBLY

(71) Applicant: Rolls-Royce Solutions GmbH, Friedrichshafen (DE)

(72) Inventor: Armin Dölker, Friedrichshafen (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 120 days.

(21) Appl. No.: 18/537,239

(22) Filed: Dec. 12, 2023

(65) Prior Publication Data
US 2024/0117777 A1    Apr. 11, 2024

Related U.S. Application Data

(63) Continuation of application No. PCT/EP2022/066831, filed on Jun. 21, 2022.

(30) Foreign Application Priority Data

Jun. 22, 2021    (DE) ..................... 10 2021 206 424.8
Jun. 21, 2022    (WO) ................. PCT/EP2022/066831

(51) Int. Cl.
*F02D 29/06*    (2006.01)
*F02D 41/14*    (2006.01)
(Continued)

(52) U.S. Cl.
CPC ......... *F02D 29/06* (2013.01); *F02D 41/1401* (2013.01); *H02P 9/00* (2013.01);
(Continued)

(58) Field of Classification Search
CPC .. F02D 29/06; F02D 41/1401; F02D 2250/18; H02P 9/00; H02P 2101/25; H02P 2205/03
(Continued)

(56) References Cited

U.S. PATENT DOCUMENTS 6,278,915 B1 *  8/2001  Deguchi ............... B60W 10/26
                                                    701/87
6,401,016 B1 *  6/2002  Yoshino .................. B60L 50/61
                                                    477/3

(Continued)

FOREIGN PATENT DOCUMENTS

DE        102 48 633 A1    5/2004
DE    10 2014 001 226 A1   7/2015

OTHER PUBLICATIONS

International Search Report and Written Opinion dated Dec. 1, 2022 for International Patent Application No. PCT/ EP2022/066831 (15 pages).

*Primary Examiner* — Manglesh M Patel
(74) *Attorney, Agent, or Firm* — TAYLOR & EDELSTEIN, PC

(57) ABSTRACT

A closed-loop control device, for closed-loop control of a power assembly including an internal combustion engine and a generator operatively connected in terms of drive to the internal combustion engine, includes: the closed-loop control device which is configured for: detecting a generator power ($P_G$) of the generator as a controlled variable; ascertaining a control deviation ($e_P$) as a difference between the generator power ($P_G$) which is detected and a target generator power ($P_{target}$); determining a target torque ($M_{target}$) as a manipulated variable for actuating the internal combustion engine as a function of the control deviation ($e_P$); using a control rule to determine the target torque ($M_{target}$); and determining the control rule used to determine the target torque ($M_{target}$) as a function of a predetermined loop gain ($v^P$).

15 Claims, 8 Drawing Sheets

(51) Int. Cl.
*H02P 9/00* (2006.01)
*H02P 101/25* (2016.01)

(52) U.S. Cl.
CPC ...... *F02D 2250/18* (2013.01); *H02P 2101/25* (2015.01); *H02P 2205/03* (2013.01)

(58) Field of Classification Search
USPC ....................................... 701/22, 54, 84, 101
See application file for complete search history.

(56) References Cited

U.S. PATENT DOCUMENTS

| | | | |
|---|---|---|---|
| 7,778,761 B2 | 8/2010 | Böckhoff et al. | |
| 8,922,036 B2 * | 12/2014 | Tani | H02P 9/48 290/40 C |
| 9,628,010 B2 | 4/2017 | Clarke et al. | |
| 2001/0048226 A1 * | 12/2001 | Nada | F02N 11/04 290/40 C |
| 2007/0227792 A1 * | 10/2007 | Yonemori | B60W 10/06 903/902 |
| 2009/0140521 A1 * | 6/2009 | Bryan | B60K 6/445 290/31 |
| 2010/0305797 A1 * | 12/2010 | Jiang | B60W 20/15 701/22 |
| 2011/0313602 A1 * | 12/2011 | Hirata | B60K 6/365 180/65.265 |
| 2012/0078457 A1 * | 3/2012 | Tajima | B60L 58/24 180/65.265 |
| 2013/0190132 A1 * | 7/2013 | Izawa | B60W 10/08 180/65.265 |
| 2013/0304297 A1 * | 11/2013 | Ito | B60W 20/11 180/65.265 |
| 2013/0307329 A1 * | 11/2013 | Ito | A61B 6/037 307/10.1 |
| 2014/0046527 A1 * | 2/2014 | Ito | B60W 20/11 180/65.265 |
| 2014/0058604 A1 * | 2/2014 | Ito | B60W 20/00 180/65.265 |
| 2014/0067180 A1 * | 3/2014 | Tagawa | B60W 20/00 180/65.265 |
| 2014/0074334 A1 * | 3/2014 | Tagawa | B60W 10/26 180/65.265 |
| 2014/0081499 A1 * | 3/2014 | Ito | B60W 10/26 180/65.265 |
| 2014/0081500 A1 * | 3/2014 | Ito | B60W 20/10 903/930 |
| 2014/0088807 A1 * | 3/2014 | Saito | B60W 30/1882 180/65.265 |
| 2014/0188319 A1 * | 7/2014 | Ohno | B60W 10/08 180/65.265 |
| 2016/0215480 A1 * | 7/2016 | Ishihara | E02F 9/2075 |
| 2017/0254275 A1 | 9/2017 | Klotzek | |
| 2021/0111651 A1 | 4/2021 | Manson et al. | |
| 2021/0111652 A1 | 4/2021 | Schweitzer, III et al. | |

* cited by examiner

CONTROL DEVICE FOR CONTROLLING A POWER ASSEMBLY

CROSS REFERENCE TO RELATED APPLICATIONS

This is a continuation of PCT application no. PCT/EP2022/066831, entitled "CONTROL DEVICE FOR CONTROLLING A POWER ASSEMBLY, WHICH COMPRISES AN INTERNAL COMBUSTION ENGINE AND A GENERATOR DRIVINGY CONNECTED TO THE INTERNAL COMBUSTION ENGINE, CONTROL ASSEMBLY COMPRISING SUCH A CONTROL DEVICE, POWER ASSEMBLY, AND METHOD FOR CONTROLLING A POWER ASSEMBLY", filed Jun. 21, 2022, which is incorporated herein by reference. PCT application no. PCT/EP2022/066831 claims priority to German patent application no. 10 2021 206 424.8, filed Jun. 22, 2021, which is incorporated herein by reference.

BACKGROUND OF THE INVENTION

1. Field of the Invention

The present invention relates to a closed-loop control device, and, more particularly, to a closed-loop control device for closed-loop control of a power assembly.

2. Description of the Related Art

A control device of this kind is typically configured to control a speed of an internal combustion engine and, indirectly thereby, a generator frequency of a generator operatively connected in terms of drive to the internal combustion engine, a power assembly including the internal combustion engine and the generator. This is problematic insofar as a comparatively dynamic variable is used for the closed-loop control process, with a gain of the controlled system also being relatively great. The closed-loop control process is therefore intrinsically comparatively less robust, which has a particularly detrimental effect on steady-state control behavior. This applies to a particularly great extent when the power assembly is operated in conjunction with other power assemblies in island parallel operation or grid parallel operation, where a requested total power is distributed across the various power assemblies by way of an external open-loop control unit. This load distribution is a relatively slow process, where the resulting delay can be at least partly compensated for by increased dynamics of the speed control process. However, the speed controller itself can only react when a drop in the speed is detected and not merely if the requested power is increased. In any case, this results in a delay which in principle cannot be overcome using the outlined concept.

What is needed in the art is a closed-loop control device for closed-loop control of a power assembly, which includes an internal combustion engine and a generator operatively connected in terms of drive to the internal combustion engine, a closed-loop control assembly including such a closed-loop control device, a power assembly, which includes an internal combustion engine and a generator operatively connected in terms of drive to the internal combustion engine, including such a closed-loop control device or including such a closed-loop control assembly, and a method for closed-loop control of such a power assembly, where the mentioned disadvantages do not arise.

SUMMARY OF THE INVENTION

The present invention relates to a closed-loop control device for closed-loop control of a power assembly, which comprises an internal combustion engine and a generator operatively connected in terms of drive to the internal combustion engine, a closed-loop control assembly comprising such a closed-loop control device, a power assembly, which comprises an internal combustion engine and a generator operatively connected in terms of drive to the internal combustion engine, comprising such a closed-loop control device or comprising such a closed-loop control assembly, and a method for closed-loop control of a power assembly.

The present invention provides a closed-loop control device for closed-loop control of a power assembly, which includes an internal combustion engine and a generator operatively connected in terms of drive to the internal combustion engine. The closed-loop control device is configured to detect a generator power of the generator as a controlled variable, to ascertain a control deviation as the difference between the detected generator power and a target generator power, to determine a target torque as a manipulated variable—in particular for actuating the internal combustion engine—as a function of the control deviation. The closed-loop control device is furthermore configured to use a control rule to determine the target torque, and to determine the control rule used to determine the target torque as a function of a predetermined loop gain. Detecting the generator power as a control variable results in a more dynamic adaptation to any change in load. In particular, the delay which cannot be overcome using the concept outlined above can thus be overcome. If the requested power changes, for example because one or more consumers are connected or disconnected, the detected generator power also changes abruptly, in particular instantaneously, while other variables, such as in particular the speed or else a generator frequency, only react with the delay described above. Therefore, if the generator power is detected as a controlled variable, it is possible to react significantly more quickly to a change in load than when the generator frequency or the speed is detected as a controlled variable. The load switching behavior of a power assembly including the closed-loop control device proposed here can thus be significantly improved. The result is also a more robust load distribution across the individual power assemblies in the network since manipulated variables can be calculated directly instead of indirectly by stringing together at least two algorithms—such as in the case of a speed control process, for example. In particular, it is advantageously possible to circumvent or save using a speed controller in the closed-loop control device proposed here. Another factor contributing to the improvement in the dynamic control behavior is the fact that the target torque is determined as a manipulated variable for actuating the internal combustion engine directly as a function of the closed-loop power control process.

In the context of the present technical teaching, a control rule is understood to mean in particular a mathematical relationship, in particular an equation, which describes the behavior of a controller. In particular, the control rule describes the relationship between the manipulated variable and the control deviation. In particular, the control rule describes how the manipulated variable behaves as a function of the control deviation. In an optional configuration, the control rule describes the behavior of a controller selected from a group consisting of a P controller, an I controller, a D controller, a PI controller, a PD controller, a PD1 controller, a PD2 controller, a PID controller, a PT1 controller, a PT2 controller, a $PI(DT_1)$ controller and a combination of at least two of the aforementioned controllers. Control rules which describe the behavior of these and other controllers are known in principle to a person skilled in the art.

The control rule is optionally implemented in the closed-loop control device, optionally in a hardware structure of the closed-loop control device or in the form of software executed on the closed-loop control device during operation of the closed-loop control device. In particular, on one hand it is possible that the manipulated variable is calculated as a function of the control deviation explicitly by carrying out certain computational steps in software; however, it is also possible that the manipulated variable is determined as a function of the control deviation on the basis of the particular interconnection of the hardware structure of the closed-loop control device, that is to say it is calculated virtually indirectly.

A power assembly is understood here in particular as an assembly composed of an internal combustion engine and an electric machine able to be operated as a generator, that is to say a generator, wherein the internal combustion engine is operatively connected in terms of drive to the generator in order to drive the generator. The power assembly is thus configured in particular to convert chemical energy which is converted to mechanical energy in the internal combustion engine into electrical energy in the generator. The power assembly is operated in particular with a plurality of—in particular, a few—other power assemblies together in a network, that is to say in island parallel operation, or the power assembly is operated in grid parallel operation in an, in particular larger, power grid or energy supply grid, in particular a nationwide power grid.

The generator power detected here as controlled variable is in this case detected separately in particular at each power assembly of a network of power assemblies for the respective power assembly and is used for closed-loop control of the respective power assembly. The generator power detected as controlled variable is thus not a total power of the network of power assemblies but instead the power produced by each individual power assembly. In particular, the generator power is optionally not detected at a busbar to which a plurality of power assemblies are electrically connected.

The generator power is optionally detected at the generator of the power assembly.

The target generator power is in particular a power component generated by an external open-loop control unit or an external controller for the respective power assembly, that is to say in particular for the respective closed-loop control device, that is to say that component of the total load or total power which should be produced by the respective power assembly. To this end, a total load is optionally detected—in particular at the busbar—by the external open-loop control unit, said total load then being distributed across the individual power assemblies according to an algorithm implemented in the external open-loop control unit. In particular, the closed-loop control device is configured to be connected to the external open-loop control unit in order to receive the target generator power from the external open-loop control unit—as the load component associated therewith. In particular, the closed-loop control device optionally has an interface suitable for this.

However, option is also given to a configuration in which the closed-loop control device is configured to determine the target generator power itself, that is to say in particular to detect the total power and distribute it across a plurality of closed-loop control devices—including itself. In this case, the closed-loop control device is optionally designed as a master closed-loop control device. It optionally has an interface via which load requirements calculated for other closed-loop control devices can be output, in particular to slave closed-loop control devices, for example an interface for a CAN bus.

The fact that the closed-loop control device is configured to determine the control rule used to determine the target torque as a function of the predetermined loop gain means in particular that the closed-loop control device is configured to stipulate the control rule as a function of the predetermined loop gain, optionally to calculate it as a function of the predetermined loop gain. In particular, the closed-loop control device is optionally configured to determine, in particular to stipulate, optionally to calculate, the proportional coefficient of the control rule as a function of the predetermined loop gain. The closed-loop control device is optionally configured to stipulate, optionally to calculate, the proportional coefficient proportionally to the predetermined loop gain.

The predetermined loop gain is optionally the predetermined loop gain of the open control loop. In the context of the present technical teaching, a loop gain of the open control loop is understood to mean in particular the product of the proportional coefficient of the control rule and the static (s=0) gain of the control loop upon sudden excitation.

The predetermined loop gain can optionally be parameterized, that is to say in particular can be set or predefined by a user. In this way, a user of the closed-loop control device or a user of a power assembly operated using the closed-loop control device can set the loop gain as desired. The proportional coefficient is then optionally adapted to the loop gain selected by the user in a suitable manner. This has the advantage in particular that the closed-loop control device does not need to be matched to the power assembly, which is complex.

In one optional configuration, if the control rule is additionally adapted as a function of at least one further adaptation variable, which is variable in particular during operation of the power assembly, the dependency on the predetermined control loop is not explicitly observed further in this context since the predetermined loop gain is optionally set at most once by a user and is otherwise kept constant. It can thus be considered as a constant in particular for the running operation of the power assembly.

The target torque is used in particular to indirectly actuate the internal combustion engine. In one optional configuration, the closed-loop control device or an open-loop control device of the internal combustion engine operatively connected to the closed-loop control device is used to calculate an energization duration for at least one fuel injection valve, in particular an injector, of the internal combustion engine as a function of the target torque, wherein the internal combustion engine is actuated using the energization duration calculated from the target torque.

In the context of the present technical teaching, a generator frequency is understood to mean in particular the frequency of the voltage induced in the generator, in particular the frequency of the output voltage of the generator.

A closed-loop control device is understood to mean in particular a feedback control device. Correspondingly, a closed-loop control arrangement is understood to mean in particular a feedback control arrangement. Accordingly, an open-loop control device is understood to mean in particular a non-feedback control device.

According to one development of the present invention, provision is made for the closed-loop control device to be configured to adapt the control rule as a function of at least one adaptation variable. The at least one adaptation variable is selected from a group consisting of the detected generator power, a target torque variable, and a generator frequency. In particular, the closed-loop control device is configured to adapt the control rule as a function of the at least one adaptation variable in addition to it being determined as a function of the predetermined loop gain. The fact that the control rule is adapted as a function of the at least one adaptation variable advantageously makes it possible to keep the loop gain similar at all operating points, optionally constant across all operating points at the predetermined value, in particular at the value parameterized by the user. This in turn simplifies the control behavior and thus at the same time the setting of the closed-loop control device to the specific use case as well. In particular, in this way the closed-loop control device can be easily adapted and can be used easily and reliably, which not least also saves costs during use.

The use and in particular the adaptation of the control rule furthermore makes it possible to operate the closed-loop control device in combination with a plurality of different power assemblies, in particular with a plurality of different internal combustion engines, without this requiring specific adaptation to the specifically operated power assembly, in particular to the specifically operated internal combustion engine. As a result, the power assembly, in particular the internal combustion engine, can be operated virtually without adaptation, such that the adaptation effort otherwise required in conventional closed-loop control devices and methods is advantageously minimal, optionally completely eliminated, when using the technical teaching according to the present invention or optionally according to the present invention.

In the context of the present technical teaching, an adaptation of the control rule as a function of at least one adaptation variable is understood to mean in particular that at least one parameter which determines the control rule is changed as a function of the at least one adaptation variable. In an optional configuration, the control rule is adapted as a function of the at least one adaptation variable by virtue of the proportional coefficient of the control rule being changed as a function of the at least one adaptation variable. In this case, the control rule is determined as a parameter in particular by the proportional coefficient. An adaptation variable is accordingly understood to mean a variable as a function of which the at least one parameter which determines the control rule is changed. In particular, an adaptation variable is a variable on which a value of the at least one parameter which determines the control rule is dependent.

The control rule is optionally updated as a function of the at least one adaptation variable, where said control rule is adapted in particular to changing operating points of the power assembly—in particular automatically.

In an optional configuration, the target torque variable is optionally the target torque itself—which is optionally delayed by at least one sampling step. According to another optional configuration, the target torque variable is an integral component (I component) for the target torque or a variable derived from the target torque or the integral component.

The closed-loop control device is optionally configured to provide a lower limit value for the detected generator power, in particular a predetermined power limit value.

As an alternative or in addition, the closed-loop control device is optionally configured to provide a lower limit value for the target torque variable, in particular a predetermined torque limit value.

As an alternative or in addition, the closed-loop control device is optionally configured to provide a lower limit value for the detected generator frequency, in particular a predetermined frequency limit value.

For the purpose of the following derivation, a stationary state is considered, for which reason the values concerned are given with the index "stat". However, the relationships, correlations and equations derived in this way are also applicable to transient states.

If the controlled system of the power assembly is modeled as a dual-mass oscillator, the following transfer function results for the power control process:

$$G_s^P(s) = \frac{P_G(s)}{M_{target}(s)} = \frac{P_{G,stat}}{15 M_{m,stat}} \frac{1 + \frac{\Psi}{2\pi\Omega}s}{1 + \left\{\frac{\theta_m + \theta_L}{l_{stat}} + \frac{\Psi}{2\pi\Omega}\right\}s + \left\{\frac{\Psi\Omega\theta_m\theta_L}{2\pi l_{stat}c} + \frac{\theta_m}{c}\right\}s^2 + \frac{\theta_m\theta_L}{l_{stat}c}s^3}, \quad (1)$$

with the detected generator power $P_G$, the target torque $M_{target}$ of the internal combustion engine, the torque $M_{m,stat}$ of the internal combustion engine, the generator power $P_{G,stat}$, and a term which is dependent on the complex variable s and the quantities of which are named below.

Equation (1) then results in the—in particular constantly—predefinable loop gain $v^P$ of the open control loop when a power controller with at least proportional behavior, that is to say for example a P controller, a PI controller, a PID controller or a PI(DT$_1$) controller, is used:

$$v^P = k_p^P \frac{P_{G,stat}}{15 M_{m,stat}}, \quad (2)$$

and solved according to the proportional coefficient $k_P^P$:

$$k_p^P = \frac{15 v^P M_{m,stat}}{P_{G,stat}}. \quad (3)$$

Equation (3) shows that it is advantageously possible to keep the, optionally constantly, selected loop gain constant at all operating points of the power assembly by changing, in particular updating, the proportional coefficient $k_p^P$ in a suitable manner. A correlation such as equation (3) is sometimes also referred to as a control rule for short.

The transfer function according to equation (1) can be derived from the model of the control loop as a dual-mass oscillator in particular in the following manner:

Within the context of the model of the dual-mass oscillator, it is assumed that the moment of inertia $\theta_m$ of the internal combustion engine is connected via a shaft to the moment of inertia of the generator $\theta_L$, where this torque-transmitting connection is described by a spring stiffness c and a damping b (b in this case describes the dimensional damping, which is later converted to the dimensionless damping $\Psi$). With the angle of rotation $\rho_m$ of the internal combustion engine, the angle of rotation $\rho_L$ of the generator, the torque $M_m$ applied by the internal combustion engine, the load torque $M_L$ acting on the generator and the known notation with superimposed points for the time derivative, the following equations then result for the torque balance:

$$\theta_m \ddot{\rho}_m = M_m - c(\rho_m - \rho_L) - b(\dot{\rho}_m - \dot{\rho}_L), \text{ and} \tag{4}$$

$$\theta_L \ddot{\rho}_L = -M_L - c(\rho_L - \rho_m) - b(\dot{\rho}_L - \dot{\rho}_m), \tag{5}$$

$$M_L = k_G \frac{\dot{\rho}_L}{2\pi}. \tag{6}$$

with wherein $k_G = \pi l^2 B^2 A^2 \frac{\cos\varphi}{|X_L|}$, (7)

with the number l and the area A of the conductor loops of the generator, the magnetic flux density B, and the impedance $X_L$ of the load electrically connected to the generator, wherein equation (7) is easily derived from a consideration of the electrodynamic load behavior of the generator, the following resulting after linearization in a stationary operating state after some transformations:

$$\Delta \ddot{\rho}_m - \Delta \ddot{\rho}_L = -c(\Delta\rho_m - \Delta\rho_L)\left\{\frac{1}{\theta_m} + \frac{1}{\theta_L}\right\} - b(\Delta\dot{\rho}_m - \Delta\dot{\rho}_L)\left\{\frac{1}{\theta_m} + \frac{1}{\theta_L}\right\} + + \frac{\Delta M_m}{\theta_m} + \frac{1}{2\pi\theta_L}k_G \Delta\dot{\rho}_L. \tag{8}$$

In this case, the variables preceded by $\Delta$ are the deflections from the stationary operating point used in the linearization. With $$\Omega := \sqrt{c\left\{\frac{1}{\theta_m} + \frac{1}{\theta_L}\right\}}, \text{ and} \tag{9}$$

$$\Psi := \frac{2\pi\Omega b}{c}, \tag{10}$$

whereby at the same time the dimensionless damping $\Psi$ is introduced, the following is given:

$$\Delta \ddot{\rho}_m - \Delta \ddot{\rho}_L = \tag{11}$$
$$-\Omega^2(\Delta\rho_m - \Delta\rho_L) - \frac{\Psi\Omega}{2\pi}(\Delta\dot{\rho}_m - \Delta\dot{\rho}_L) + + \frac{\Delta M_m}{\theta_m} + \frac{1}{2\pi\theta_L}k_G \Delta\dot{\rho}_L, \text{ and}$$

$$\Delta \ddot{\rho}_L = \frac{1}{\theta_L}\left\{c(\Delta\rho_m - \Delta\rho_L) + \frac{c\Psi}{2\pi\Omega}(\Delta\dot{\rho}_m - \Delta\dot{\rho}_L) - \frac{1}{2\pi}k_G \Delta\dot{\rho}_L\right\}. \tag{12}$$

If the three variables $x_1$, $x_2$ and $x_3$ as follows are now introduced:

$$x_1 := \Delta\rho_m - \Delta\rho_L, \tag{13}$$

$$x_2 := \Delta\dot{\rho}_m - \Delta\dot{\rho}_L, \text{ and} \tag{14}$$

$$x_3 := \Delta\dot{\rho}_L, \tag{15}$$

this gives:
$$\begin{bmatrix} \dot{x}_1 \\ \dot{x}_2 \\ \dot{x}_3 \end{bmatrix} = \begin{bmatrix} 0 & 1 & 0 \\ -\Omega^2 & -\frac{\Psi\Omega}{2\pi} & \frac{k_G}{2\pi\theta_L} \\ \frac{c}{\theta_L} & \frac{c\Psi}{2\pi\theta_L\Omega} & -\frac{k_G}{2\pi\theta_L} \end{bmatrix} \begin{bmatrix} x_1 \\ x_2 \\ x_3 \end{bmatrix} + \begin{bmatrix} 0 \\ \frac{1}{\theta_m} \\ 0 \end{bmatrix} \Delta M_m. \tag{16}$$

with $\underline{x} := \begin{bmatrix} x_1 \\ x_2 \\ x_3 \end{bmatrix}$, (17)

$$A := \begin{bmatrix} 0 & 1 & 0 \\ -\Omega^2 & -\frac{\Psi\Omega}{2\pi} & \frac{k_G}{2\pi\theta_L} \\ \frac{c}{\theta_L} & \frac{c\Psi}{2\pi\theta_L\Omega} & -\frac{k_G}{2\pi\theta_L} \end{bmatrix}, \text{ and} \tag{18}$$

$$\underline{b} := \begin{bmatrix} 0 \\ \frac{1}{\theta_m} \\ 0 \end{bmatrix} \tag{19}$$

Equation (16) corresponds as follows:

$$\underline{\dot{x}} = A\underline{x} + \underline{b}\Delta M_m. \tag{20}$$

After Laplace transformation and transition to the transfer function, the following is obtained:

$$G(s) = \frac{\underline{c}^T P(s) \underline{b}}{\|sI - A\|}, \tag{21}$$

with the adjugates $P(s)$ of the matrix $(sI-A)$ and the unit matrix I.

Since the speed deflection $\Delta n_L$ of the generator at the steady-state operating point is given by $$\Delta n_L = \frac{1}{2\pi}x_3. \tag{22}$$

the following is used to derive the transfer function for the frequency control:

$$y := \begin{bmatrix} 0 & 0 & \frac{1}{2\pi} \end{bmatrix} \underline{x}, \text{ and} \tag{23}$$

$$\underline{c}^T := \begin{bmatrix} 0 & 0 & \frac{1}{2\pi} \end{bmatrix}. \tag{24}$$

With the definitions $$P_{G,stat} = 2\pi k_G n_{L,stat}^2. \tag{25}$$

wherein $n_{L,stat}$ is the speed of the generator at the steady-state operating point, and, after switching to dimensionless representation—with the speed specified in 1/min, the frequency in Hz and the power in kW, $$l_{stat} := \frac{9 \cdot 10^5 P_{G,stat}}{\pi^2 n_{L,stat}^2} \tag{26}$$

the following transfer function for the generator speed $n_L$ as a function of the torque $M_{target}$ is finally obtained from equation (21):

$$G_m(s) = \frac{n_L(s)}{M_{target}(s)} = \tag{27}$$

-continued $$= \frac{n_{L,stat}}{30 M_{m,stat}} \frac{1 + \frac{\Psi}{2\pi\Omega} s}{1 + \left\{\frac{\theta_m + \theta_L}{I_{stat}} + \frac{\Psi}{2\pi\Omega}\right\} s + \left\{\frac{\Psi\Omega\theta_m\theta_L}{2\pi I_{stat}c} + \frac{\theta_m}{c}\right\} s^2 + \frac{\theta_m\theta_L}{I_{stat}c} s^3}.$$

The generator power $P_G$ depends on the generator speed $n_L$ and the load torque $M_L$. Using equations (6) and (25), the following results after linearization in the steady state and transition to the dimensionless illustration:

$$\Delta P_G = \frac{2 P_{G,stat}}{n_{i,stat}} \Delta n_L, \tag{28}$$

and from this directly the transfer function for the generator power $P_{G,stat}$ as a function of the generator speed $n_{L,stat}$:

$$G_P(s) = \frac{P_G(s)}{n_L(s)} = \frac{2 P_{G,stat}}{n_{L,stat}}, \tag{29}$$

and finally, equation (1) results directly from equations (27), (29) and (30) using the transfer function of the controlled system:

$$G_s^P(s) = G_m(s) G_p(s), \tag{30}$$

According to one development of the present invention, provision is made for the closed-loop control device to be configured to adapt the control rule by determining the proportional coefficient of the control rule in such a way that the predetermined loop gain is constant, optionally remains constant—in particular over all operating points of the power assembly. Very particularly, in this way, the closed-loop control device can be easily adapted and can be used easily and reliably. In particular, equation (3) shows that it is possible to always adjust the proportional coefficient $k_p^P$ in such a way that the loop gain $v^P$ is constant—in particular irrespective of the current operating point of the power assembly.

According to one development of the present invention, provision is made for the closed-loop control device to be configured to determine the proportional coefficient as a function of the detected generator frequency and the target torque variable. In particular, the closed-loop control device is optionally figured to determine the proportional coefficient $k_p^P$ according to equation (3). In this way, the proportional coefficient $k_p^P$ can be updated flexibly and precisely.

The proportional coefficient $k_p^P$ is optionally determined in particular proportionally to the target torque variable. As an alternative or in addition, the proportional coefficient $k_p^P$ is determined inversely proportionally to the detected generator frequency.

According to one development of the present invention, provision is made for the closed-loop control device to be configured to determine the proportional coefficient only as a function of the generator frequency. This is a particularly simple and at the same time robust way of determining the proportional coefficient and thus adapting the control rule. In particular, the closed-loop control device is configured in this case to determine the proportional coefficient not as a function of another variable which can vary during operation of the power assembly, but instead—as already stated above—optionally as a function of the predetermined loop gain, which is typically kept constant during operation of the power assembly. In particular, the closed-loop control device is optionally configured to determine the proportional coefficient inversely proportionally to the generator frequency.

In particular, the closed-loop control device is configured to determine the proportional coefficient according to the following modified relationship:

$$k_p^p = \frac{15000 v^p}{\pi f_{G,stat}}, \tag{31}$$

with the generator frequency $f_{G,stat}$.

This can easily be derived in the following way. Considering the generator power $P_{G,stat}$ in the steady state in a dimensionless illustration results in:

$$P_{G,stat} = \frac{\pi}{3 \cdot 10^4} M_{m,stat} n_{L,stat}. \tag{32}$$

Equation (1) is reduced in the steady state due to s=0:

$$G_s^P(0) = \frac{P_{G,stat}}{15 M_{m,stat}}. \tag{33}$$

If equation (32) is now applied to equation (33) and the following is taken in account:

$$n_{L,stat} = 30 f_{G,stat}, \tag{34}$$

the result is:

$$G_s^P(0) = \frac{\pi}{15000} f_{G,stat}, \tag{35}$$

from which the modified relationship according to equation (31) then follows.

According to one development of the present invention, provision is made for the closed-loop control device to be configured to set the generator frequency to be constant for the purpose of determining the proportional coefficient. This enables particularly simple determination of the proportional coefficient. In particular, the proportional coefficient is optionally selected only as a function of predetermined loop gain—which is optionally constant during running operation of the power assembly. The corresponding simplification is possible in particular because the generator frequency typically varies only slightly during generator operation, so that there is no need to fear any major mismatch if the generator frequency is assumed to be constant. A further advantage of this configuration is that there is no longer a need to resort to measured variables, with the result that no measures need to be taken for a possible sensor failure when calculating the proportional coefficient. The calculation of the proportional coefficient is therefore advantageously as robust as possible.

In an optional configuration, a predetermined standard frequency value is set as constant generator frequency. This may be, for example, 50 Hz or 60 Hz—depending in particular on the field of application of the power assembly.

For 50 Hz, the following simplified relationship results:

$$k_p^p = \frac{300 v^p}{\pi}. \tag{36}$$

For 60 Hz, the following simplified relationship results:

$$k_p^p = \frac{250 v^p}{\pi}. \tag{37}$$

According to one configuration of the present invention, provision is made for the closed-loop control device to be configured to filter an instantaneous actual power of the generator and to use the filtered actual power as detected generator power. This advantageously enables particularly quiet and therefore robust closed-loop control. The instantaneous actual power is optionally measured directly at the generator. According to one optional configuration, the instantaneous actual power is filtered using a $PT_1$ filter or mean-value filter, wherein the detected generator power results from the $PT_1$ filter or mean filter.

According to one development of the present invention, provision is made for the closed-loop control device to be designed as an open-loop control device for direct actuation of the internal combustion engine. This represents a particularly simple and cost-effective design of the closed-loop control device, wherein in particular no additional open-loop control device beyond the already existing open-loop control device is required. In an optional configuration, the functionality of the closed-loop control device is implemented in the open-loop control device of the internal combustion engine in the form of a computer program product. This makes it particularly easy to retrofit an existing open-loop control device with the functionality according to the technical teaching presented here.

The open-loop control device is optionally an engine controller of the internal combustion engine. The open-loop control device is particularly optionally a so-called engine control unit (ECU). The engine controller or the ECU is optionally configured to calculate at least one energization duration for at least one fuel injection valve, in particular an injector, of the internal combustion engine on the basis of the target torque.

If the closed-loop control device is designed as an open-loop control device, in particular an engine controller, and is configured for direct actuation of the internal combustion engine, it is possible that speed control of the open-loop control device is active and is used in particular to calculate an energization duration for at least one fuel injection valve, in particular an injector, which is provided for injecting fuel into at least one combustion chamber of the internal combustion engine, as a function of the calculated target torque. However, it is also possible for the energization duration to be calculated from the target torque while bypassing a speed controller or without using a speed controller.

As an alternative, provision is optionally made for the closed-loop control device to be designed as a generator controller—in particular a superordinate generator controller. In this case, the closed-loop control device optionally has an interface to an open-loop control device of the internal combustion engine. This represents a particularly flexible design of the closed-loop control device. In particular, the closed-loop control device can easily be used with a multiplicity of different existing power assemblies, especially by being connected upstream of a respective open-loop control device provided there and connected thereto via the interface. The closed-loop control device is optionally configured to transmit the target torque to the open-loop control device via the interface. The open-loop control device is optionally configured to calculate at least one energization duration for at least one fuel injection valve on the basis of the target torque.

A generator controller is understood to mean in particular an open-loop control unit separate, that is to say in particular external, from the open-loop control device of the internal combustion engine, which unit is configured for closed-loop control of the generator frequency of the generator by specifying the target torque for the internal combustion engine, in particular to transmit the target torque as a manipulated variable to the open-loop control device of the internal combustion engine. In particular, a generator controller itself is not an open-loop control unit for the internal combustion engine, especially not a so-called engine control unit (ECU). In particular, the generator controller is provided in addition to the open-loop control device for the internal combustion engine, that is to say in addition to the open-loop control unit. The fact that the generator controller is optionally superordinate means that it is optionally connected upstream of the open-loop control device.

If the closed-loop control device designed as a—in particular superordinate—generator controller is used in combination with an open-loop control device of the internal combustion engine, the open-loop control device is optionally operated with deactivated speed control or without speed control. In an optional configuration, however, a final idling speed controller is activated in the open-loop control device. When the final idling speed controller is active, the speed of the internal combustion engine is subject to closed-loop control when the engine speed falls below a lower limit speed or exceeds an upper limit speed. Between the lower limit speed and the upper limit speed, the target torque used in the open-loop control device corresponds to the target torque specified by the generator controller and transmitted via the interface. In particular, a torque specification of the open-loop control device is activated in this configuration.

A suitable final idling speed controller is disclosed in particular in DE 102 48 633 B4.

According to one development of the present invention, provision is made for the closed-loop control device not to have a secondary speed control.

In particular, the closed-loop control device optionally does not have a speed specification for the internal combustion engine. In particular, the closed-loop control device optionally does not generate a speed specification for the internal combustion engine. This represents a particularly simple and functional configuration, wherein in particular only a torque specification for the internal combustion engine is generated by the closed-loop control device, which enables very robust control.

The present invention also provides a closed-loop control arrangement for closed-loop control of a power assembly, including an internal combustion engine and a generator operatively connected in terms of drive to the internal combustion engine. The closed-loop control arrangement includes a closed-loop control device according to the present invention or a closed-loop control device according to one or more of the previously described exemplary embodiments, which is designed as a—in particular superordinate—generator controller. The closed-loop control arrangement additionally includes an open-loop control device which is operatively connected to the closed-loop control device and which is configured for direct actuation of the internal combustion engine. The closed-loop control device is configured to transmit the target torque, generated as manipulated variable, to the open-loop control device. The open-loop control device optionally does not have a speed controller. As an alternative, a speed controller implemented in the open-loop control device is optionally deactivated. As an alternative, a final idling speed controller is optionally activated in the open-loop control device. In particular, the advantages which have already been explained previously in conjunction with the closed-loop control device are provided in conjunction with the closed-loop control arrangement.

In particular, the open-loop control device optionally has only one final idling speed controller, or only one final idling speed controller is active. A suitable final idling speed controller is disclosed in particular in DE 102 48 633 B4. In particular, the advantages which have already been disclosed previously in conjunction with the final idling speed controller are provided.

The present invention also provides a power assembly which has an internal combustion engine and a generator operatively connected in terms of drive to the internal combustion engine. In addition, the power assembly has a closed-loop control device according to the present invention or a closed-loop control device according to one or more of the previously described exemplary embodiments. Alternatively, the power assembly has a closed-loop control arrangement according to the present invention or a closed-loop control arrangement according to one of the previously described exemplary embodiments. The closed-loop control device or the closed-loop control arrangement is operatively connected to the internal combustion engine and the generator of the power assembly. In particular, the advantages which have already been explained previously in conjunction with the closed-loop control device and/or the closed-loop control arrangement are provided in conjunction with the power assembly.

Lastly, the object is also achieved by creating a method for closed-loop control of a power assembly including an internal combustion engine and a generator operatively connected in terms of drive to the internal combustion engine, wherein the method includes the following steps: a generator frequency of the generator is detected as a controlled variable. A control deviation is determined as the difference between the detected generator frequency and a target generator frequency. A target torque is determined as a manipulated variable—in particular for actuating the internal combustion engine—as a function of the control deviation. A control rule is used to determine the target torque. The control rule used to determine the target torque, in particular implemented in the closed-loop control device, is adapted, in particular updated, as a function of at least one adaptation variable, wherein the at least one adaptation variable is selected from a group consisting of the detected generator frequency, a target torque variable, and a generator power. In particular, the advantages which have already been explained previously in conjunction with the closed-loop control device, the closed-loop control arrangement and the power assembly are provided in conjunction with the method.

The control rule is optionally adapted, in particular updated, as a function of at least one adaptation variable, wherein the at least one adaptation variable is selected from a group consisting of the detected generator power, a target torque variable, and a generator frequency.

In an optional embodiment, the target torque itself—optionally delayed by at least one sampling step—is used as the target torque variable. According to another optional configuration, an integral component (I component) for the target torque, or a variable derived from the target torque or the integral component, is used as the target torque variable.

The control rule is optionally adapted by determining a proportional coefficient of the control rule in such a way that the predetermined loop gain of the open control loop is constant, in particular remains constant.

The proportional coefficient is optionally determined as a function of the detected generator power and the target torque variable.

The proportional coefficient is optionally determined only as a function of the generator frequency.

The generator frequency is optionally kept constant for the purpose of determining the proportional coefficient.

The detected generator power is optionally measured directly—in particular electrically at the generator—or is obtained from an instantaneous actual power of the generator as a filtered generator power by way of a filter, in particular a $PT_1$ filter or mean-value filter.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
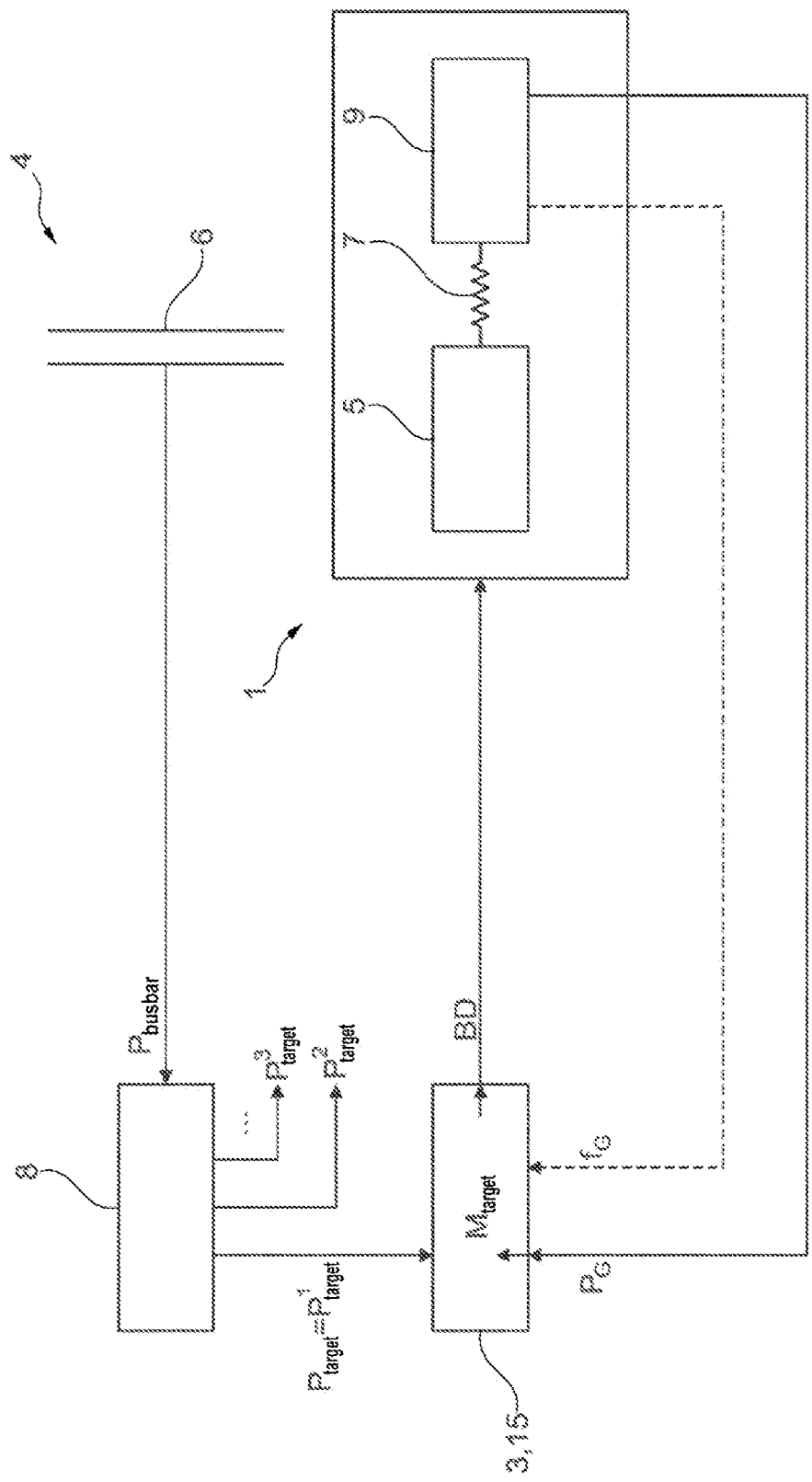
FIG. 1 shows a schematic illustration of a first exemplary embodiment of a power assembly with a first exemplary embodiment of a closed-loop control device.

FIG. 1 shows a schematic illustration of a first exemplary embodiment of a power assembly 1 with a first exemplary embodiment of a closed-loop control device 3. The power assembly 1 is part of a superordinate network of a plurality of power assemblies, of which only one is illustrated, in this case the power assembly 1 examined in more detail. In particular, the power assembly 1 is electrically connected to a power grid 4, in this case specifically by way of a busbar 6. The power assembly 1 can be operated in particular in island parallel operation or in grid parallel operation; in particular, the power grid 4 may be a local power grid, in particular an on-board power supply system of a vehicle, for example a ship, or a nationwide power grid. The power grid 4 is assigned an external open-loop control unit 8 which distributes a total power $P_{busbar}$ requested at the busbar 6, which is also referred to as total load, across the individual power assemblies 1, in particular by calculating a separate target generator power $P_{target}^1$, $P_{target}^2$, $P_{target}^3$, etc. for each power assembly 1. A first target generator power $P_{target}^1$ assigned to the power assembly 1 illustrated specifically here is referred to in the following text as target generator power $P_{target}$ for short, for the purpose of easier illustration.

The power assembly 1 includes an internal combustion engine 5 and a generator 9 operatively connected in terms of drive to the internal combustion engine 5 via a shaft 7. One side of the closed-loop control device 3 is operatively connected to the internal combustion engine 5 and the other side is connected to the generator 9. In particular, the generator 9 is electrically connected to the busbar 6 in a manner not explicitly illustrated here.

In particular, the closed-loop control device 3 is configured for closed-loop control of the power assembly 1, wherein said control device is configured to detect a generator power $P_G$ of the generator 9 as a controlled variable, to ascertain a control deviation as the difference between the detected generator power $P_G$ and a target generator power $P_{target}$, to determine a target torque $M_{target}$ as a manipulated variable for actuating the internal combustion engine 5 as a function of the control deviation, and to determine a control rule used to determine the target torque $M_{target}$ as a function of a predetermined loop gain $v^P$. In this way, in particular very dynamic and at the same time stable closed-loop control of the power assembly 1 can be provided.

The closed-loop control device 3 is optionally configured to adapt the control rule as a function of at least one adaptation variable. The adaptation variable is in this case selected from a group consisting of the detected generator power $P_G$, a target torque variable, and a generator frequency $f_G$ of the generator 9.

In the first exemplary embodiment illustrated here, the closed-loop control device 3 is designed as an open-loop control device 15, in particular as a motor controller, for direct, in particular immediate, actuation of the internal combustion engine 5.

In particular, the closed-loop control device 3 is configured to calculate from the control deviation and the target torque $M_{target}$ identified therefrom an energization duration BD for actuating injectors of the internal combustion engine 5. In this arrangement, the generator power $P_G$ is the controlled variable and the target torque $M_{target}$ calculated in the open-loop control device 15 is the manipulated variable of the power control loop.

Figure 2:
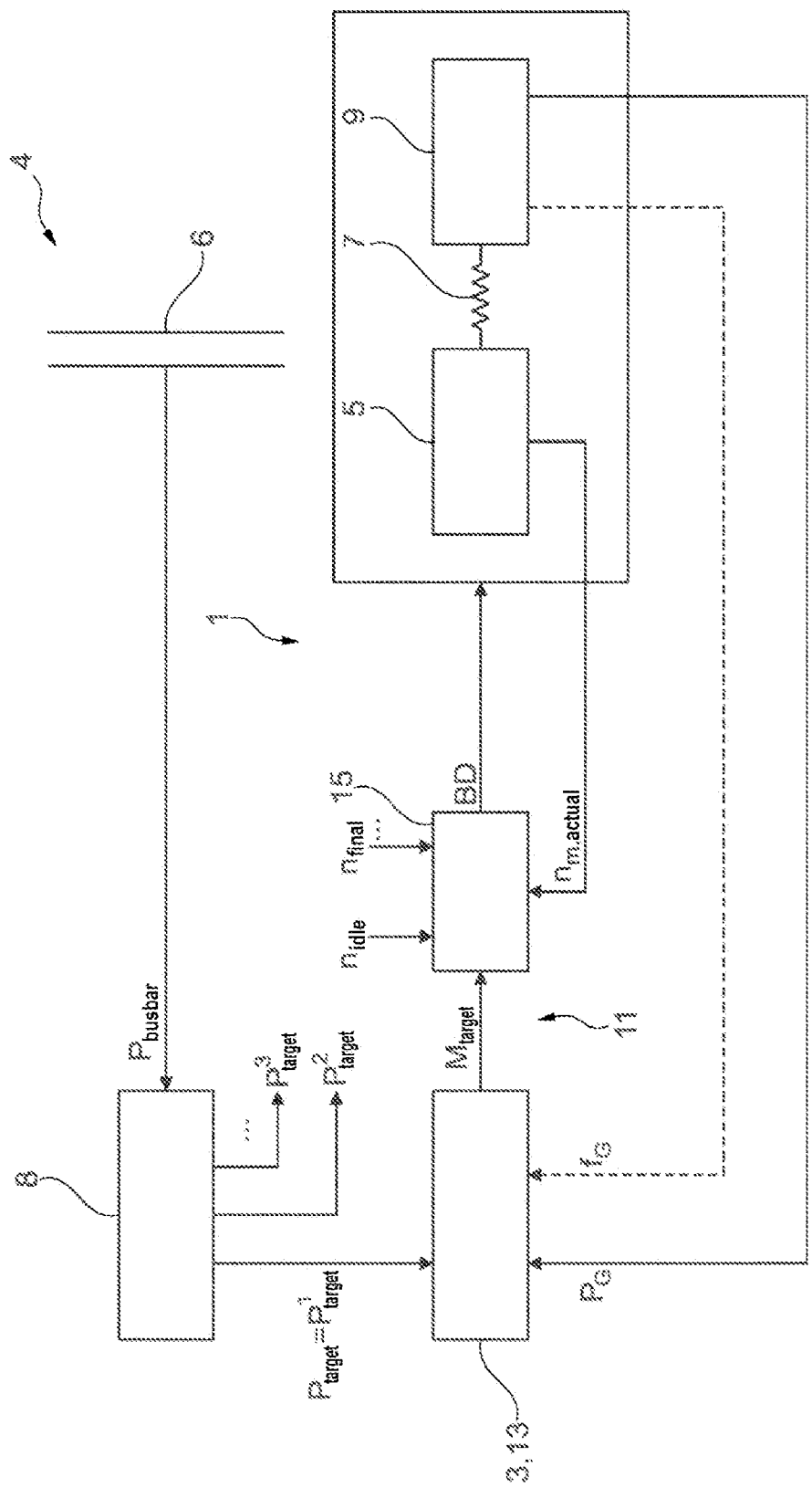
FIG. 2 shows a schematic illustration of a second exemplary embodiment of a power assembly with a first exemplary embodiment of a closed-loop control arrangement and a second exemplary embodiment of a closed-loop control device.

FIG. 2 shows a schematic illustration of a second exemplary embodiment of a power assembly 1 with a first exemplary embodiment of a closed-loop control arrangement 11 and a second exemplary embodiment of a closed-loop control device 3.

Elements that are the same or functionally equivalent are provided with the same references in all the figures, so that in this regard reference is respectively made to the preceding description.

In the second exemplary embodiment, the closed-loop control device 3 is designed as a superordinate generator controller 13. The generator controller 13 has in particular an interface to an open-loop control device 15 of the internal combustion engine 5.

The generator controller 13 in turn calculates from the target generator power $P_{target}$ and the detected generator power $P_G$ the target torque $M_{target}$, which constitutes the manipulated variable of the power control loop and is transmitted to the open-loop control device 15. The open loop control device 15 in turn calculates from the target torque $M_{target}$ the energization duration BD as actuation signal for the injectors of the internal combustion engine 5.

In this case, a speed controller of the open-loop control device 15 is optionally deactivated. A final idling speed controller of the open-loop control device 15 is optionally activated. Said final idling speed controller is used to control the engine speed when a lower speed limit $n_{idle}$ is undershot, or an upper speed limit $n_{final}$ is exceeded by a current speed $n_{m,actual}$ of the internal combustion engine 5. Between these speed limits, a target torque calculated in the open-loop control device 15 is equal to the target torque $M_{target}$ prescribed by the generator controller 13. In this case, in particular, a torque specification in the open-loop control device 15 is activated.

The closed-loop control device 3 optionally does not have any secondary speed control, in particular any speed specification for the internal combustion engine 5. In particular, the closed-loop control device 3 does not produce any secondary speed control, in particular any speed specification for the internal combustion engine 5.

Figure 3:
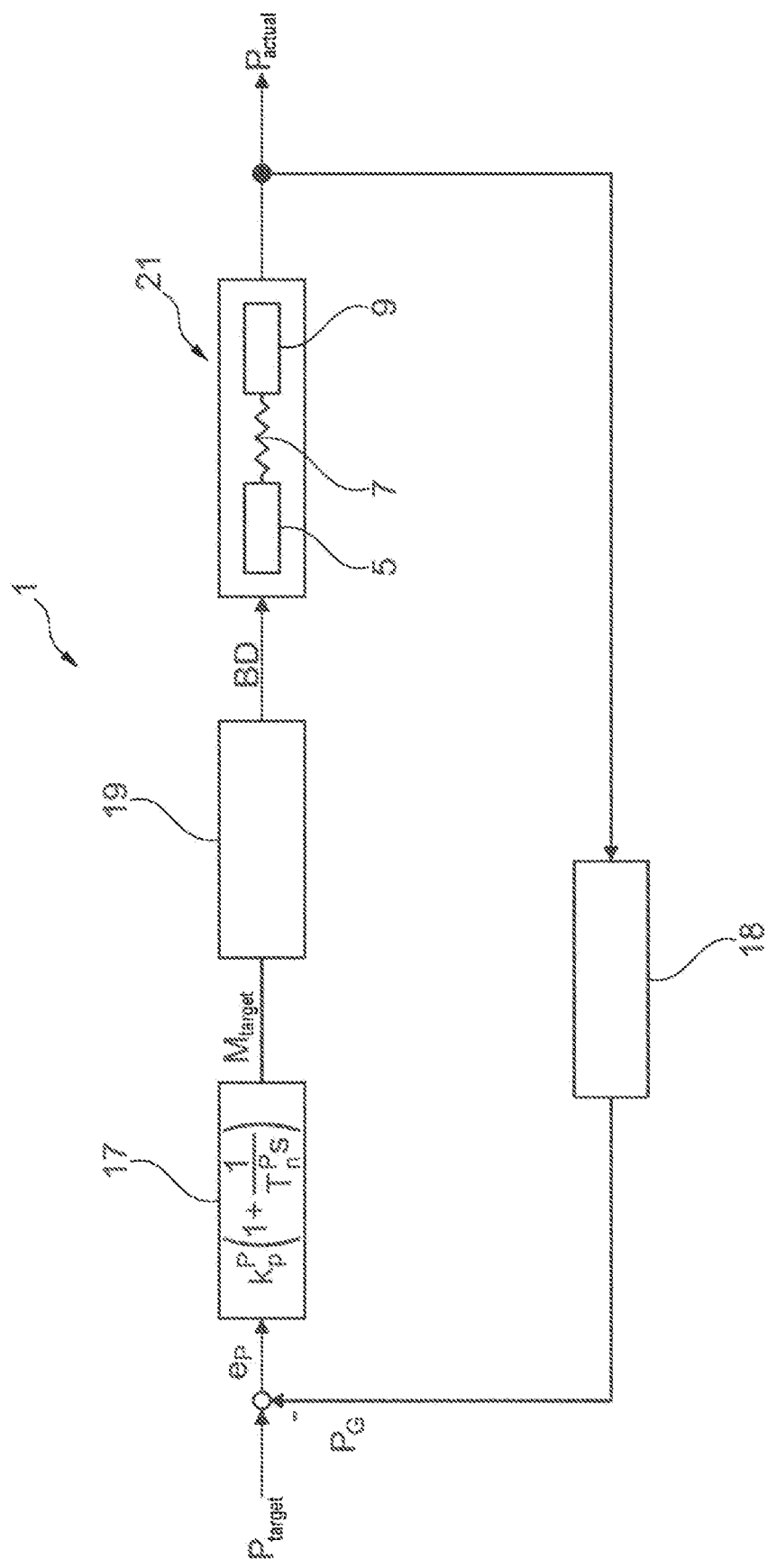
FIG. 3 shows a detailed illustration of a control loop for power control with a power controller.

FIG. 3 shows a detailed illustration of a control loop for power control with the closed-loop control device 3 as power controller 17. This illustration is not dependent on whether or not the closed-loop control device 3 is designed as an open-loop control device 15, in particular as an engine controller, or as a superordinate generator controller 13. In particular, the illustrated power controller 17 can be implemented in the open-loop control device 15 or in the generator controller 13. A conversion element 19, which is also illustrated, is accordingly implemented either together with the power controller 17 in the open-loop control device 15 or it is implemented in the open-loop control device 15 on its own when the power controller 17 is implemented in the generator controller 13.

The internal combustion engine 5 and the generator 9 are illustrated here together as controlled system 21.

FIG. 3 shows in particular the closed power control loop. The power controller 17 in this case has the control deviation $e_P$, which results as the difference between the detected generator power $P_G$ and the target generator power $P_{target}$, as input variable and the target torque $M_{target}$ as output variable. As illustrated in FIG. 3, the power controller 17 is optionally implemented as a PI algorithm; however, it can also be implemented in another optional configuration as a PID or PI(DT$_1$) algorithm. The transfer function of the PI frequency controller is as follows:

$$G_r^P(s) = k_p^P\left(1 + \frac{1}{T_n^P s}\right) = \frac{M_{target}}{e_P(s)} \tag{38}$$

with the proportional coefficient $k_p^P$ and the reset time $T_n^P$.

In the exemplary embodiment illustrated here, an instantaneous actual power $P_{actual}$ of the generator 9 is filtered in a first filter 18 and the filtered actual power is used as detected generator power $P_G$. However, a configuration in which the instantaneous actual power $P_{actual}$ of the generator 9 is used directly as detected generator power $P_G$ is also possible.

The target torque $M_{target}$ resulting as output variable of the power controller 17 is fed to the conversion element 19 as input variable. From this, the conversion element 19 calculates the energization duration BD for the injectors of the internal combustion engine 5.

Figure 4:
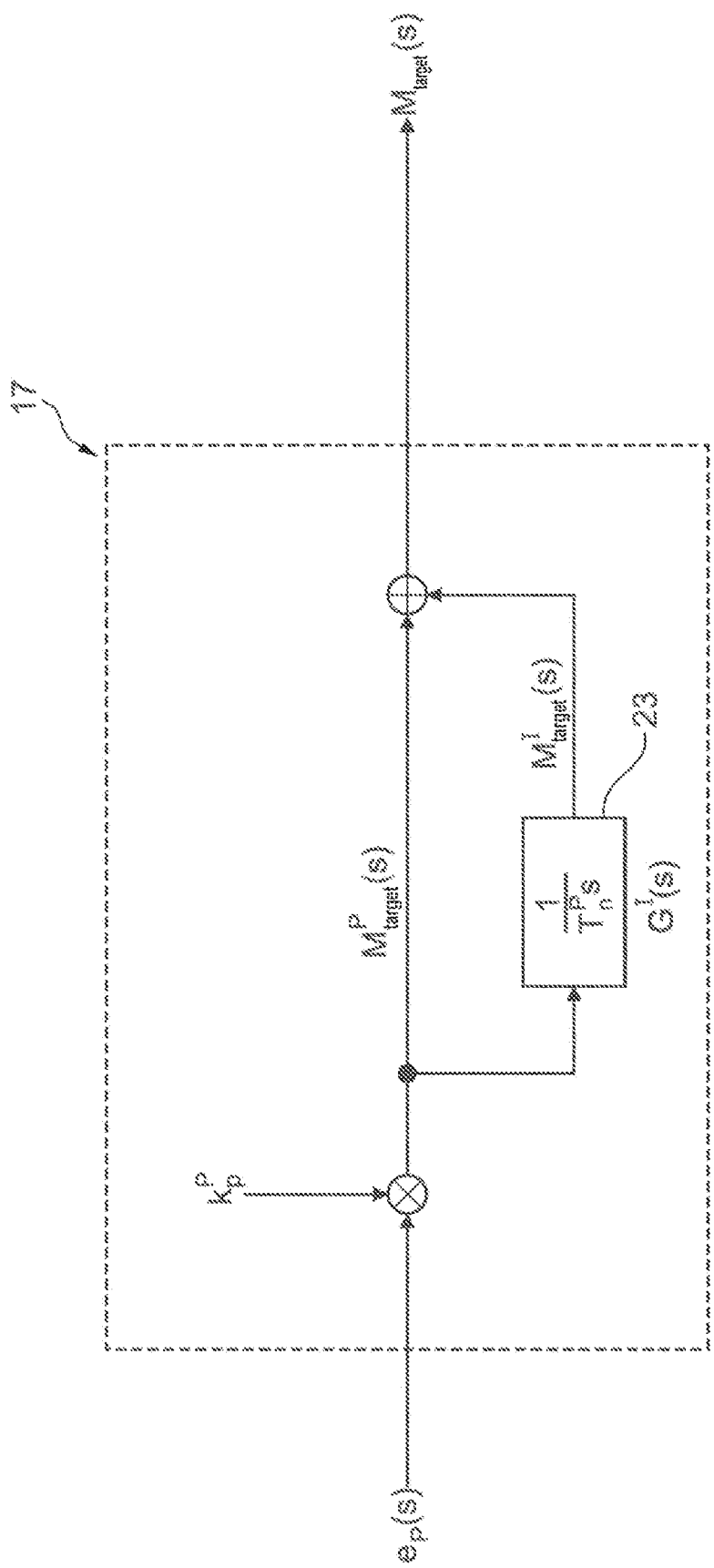
FIG. 4 shows an illustration of a power controller.

FIG. 4 shows a schematic illustration of the power controller 17 according to FIG. 3, which—as stated—is optionally implemented as a PI controller. In this case, the control deviation $e_P$ is first of all multiplied by the proportional coefficient $k_p^P$, which results in a proportional component $M_{target}^P$. An integral component $M_{target}^I$ is calculated in an integration element 23 from the proportional component $M_{target}^P$ by dividing by the product of the reset time $T_n^P$ and the complex variable s, the integral component subsequently being added to the proportional component $M_{target}^P$. This results in the target torque $M_{target}$ as output variable. The transfer function of the power controller 17 is thus given by:

$$G'(s) = \frac{1}{T_n^P s} \tag{39}$$

The proportional coefficient $k_p^P$ is optionally calculated according to equation (3). This is produced by modeling the controlled system consisting of the internal combustion engine 5, the shaft 7 and the generator 9, as illustrated above.

In this case, the control rule is adapted in particular by the proportional coefficient $k_p^P$ being determined such that the predetermined loop gain $v^P$ is constant, in particular remains constant.

Figure 5:
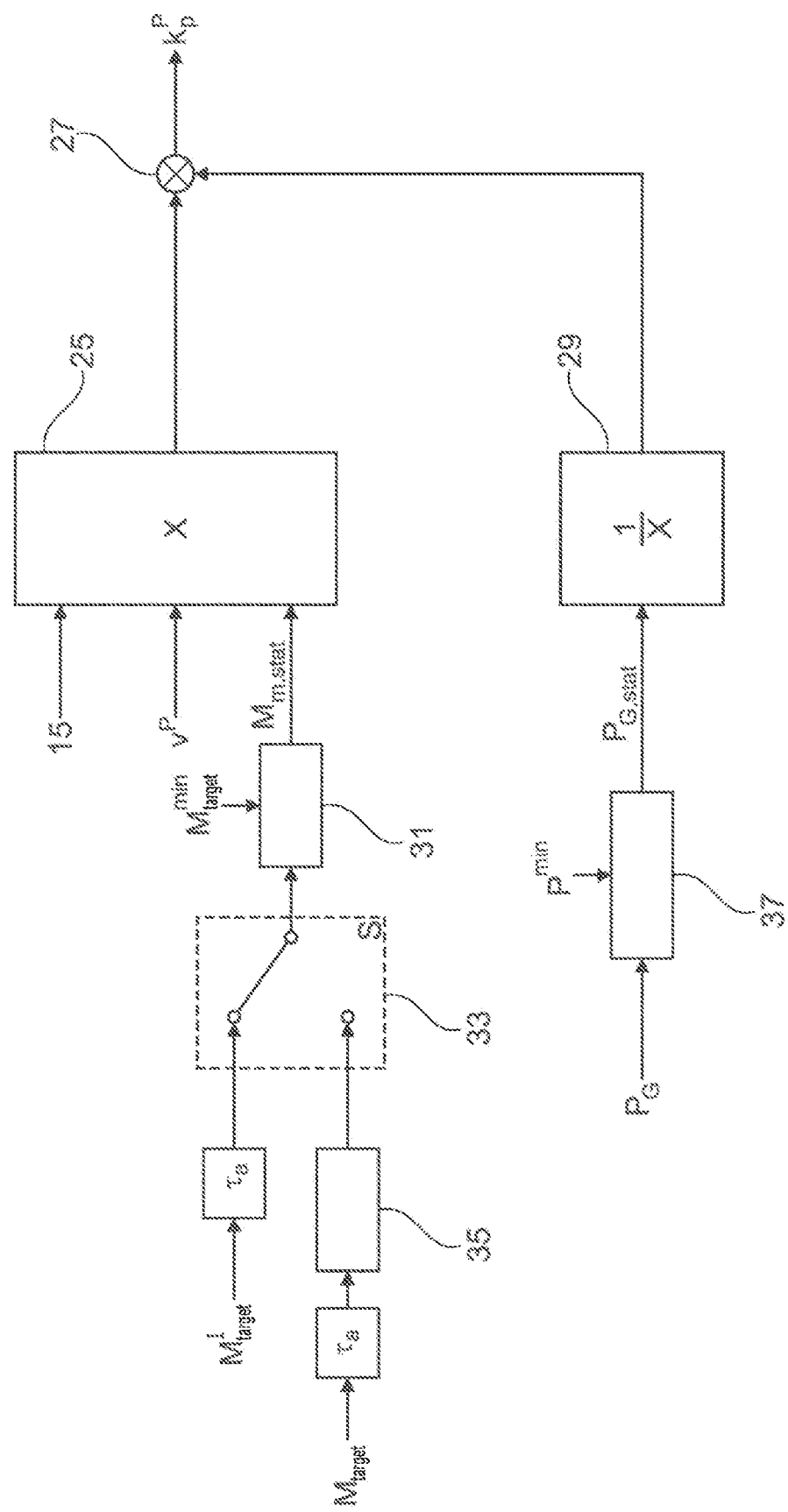
FIG. 5 shows a detailed illustration of a first embodiment of a method for calculating the proportional coefficient for the power control.

FIG. 5 shows a first option for calculating the proportional coefficient $k_p^P$. In this case, the proportional coefficient $k_p^P$ is strictly calculated according to equation (3) by virtue of the predetermined and in particular prescribable, that is to say optionally parameterizable, loop gain $v^P$ being multiplied in a first multiplication element 25 by a factor of 15 and the torque $M_{m,stat}$ as a target torque variable. The resulting product is multiplied at a first multiplication point 27 by the reciprocal value of the generator power $P_{G,stat}$ formed in a first reciprocal value element 29, that is to say as a result is divided by the generator power $P_{G,stat}$. The torque $M_{m,stat}$ can be ascertained in two different ways:

According to a first configuration, it is ascertained from the integral component $M_{target}^I$ which is delayed by a sampling step $\tau_a$ and subsequently provided in a first limiting element 31 with a lower limit at a predetermined torque limit value $M_{target}^{min}$, for example 100 Nm. In this case, a switch 33 provided for switching over between the two calculation types is in the upper switch position according to FIG. 5.

As an alternative, according to a second configuration, the torque $M_{m,stat}$ can be calculated from the target torque $M_{target}$ which is calculated by the power controller 17. This is also first of all delayed by a sampling step $\tau_a$, then filtered by a second filter 35, where the second filter 35 is optionally a $PT_1$ filter or a mean-value filter, and finally likewise provided in the first limiting element 31 with a lower limit at the predetermined torque limit value $M_{target}^{min}$. This calculation is active when the switch 33 is in the lower switch position according to FIG. 5.

The generator power $P_{G,stat}$ is calculated from the detected generator power $P_G$, where this is provided in a second limiting element 37 with a lower limit at the predetermined power limit value $P^{min}$.

Figure 6:
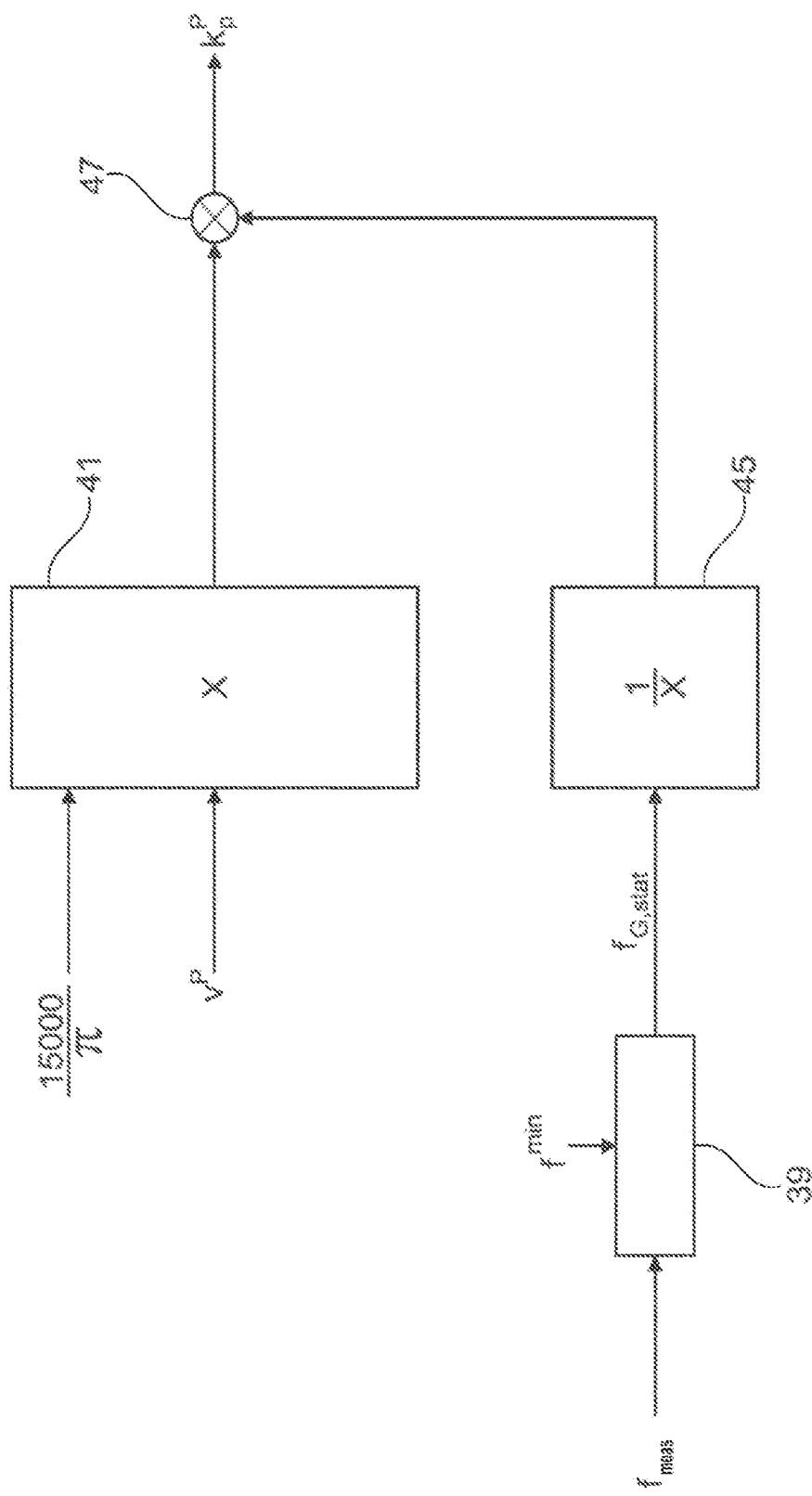
FIG. 6 shows a detailed illustration of a second embodiment of a method for calculating the proportional coefficient for the power control.

FIG. 6 shows a further embodiment of the calculation of the proportional coefficient $k_p^P$. In this case, it is determined as a function of a generator frequency $f_{G,stat}$.

The generator frequency $f_{G,stat}$ results here from a measured and optionally filtered frequency $f_{meas}$ of the generator 9 which is provided by a third limiting element 39 with a lower limit at a predetermined frequency limit value $f^{min}$.

The predetermined loop gain $v^P$ is multiplied in a second multiplication element 41 by a factor of 15,000/Π, and the proportional coefficient $k_p^P$ is obtained by dividing the resulting product by the limited generator frequency $f_{G,stat}$. To this end, the reciprocal of the limited generator frequency is formed in a second reciprocal value element 45 and this is in turn multiplied at a second multiplication point 47 by the output of the second multiplication element 41.

The proportional coefficient $k_p^P$ according to FIG. 6 is thus calculated in particular according to equation (31).

Since the generator frequency $f_{G,stat}$ typically varies only slightly during generator operation, the control rule of the power controller 17 can be further simplified by assuming the generator frequency $f_{G,stat}$ to be constant, optionally 50 Hz or 60 Hz, depending on the application. This is advantageous because the calculation of the proportional coefficient $k_p^P$ then depends only on the predetermined loop gain $v^P$, which is typically constant during operation of the power assembly 1, and not on a sensor signal. The calculation of the proportional coefficient $k_p^P$ is thus as easy and robust as possible.

Figure 7:
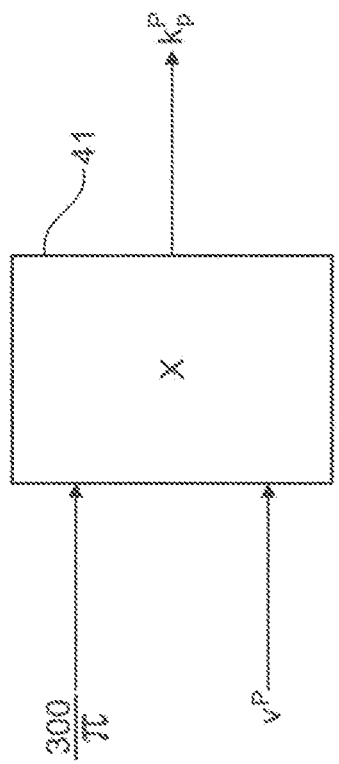
FIG. 7 shows a detailed illustration of a third embodiment of a method for calculating the proportional coefficient for the power control.

FIG. 7 here shows the corresponding variant for 50 Hz according to equation (36), where, in contrast to FIG. 6, instead of the factor 15,000/Π, a factor of 300/Π results at the same time as a replacement for the lower branch for calculating the generator frequency $f_{G,stat}$.

Figure 8:
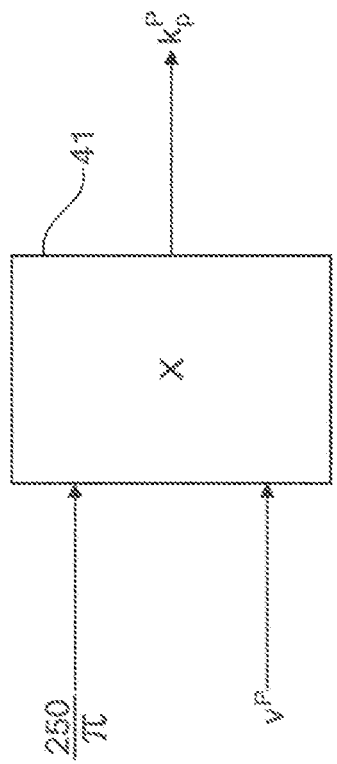
FIG. 8 shows a detailed illustration of a fourth embodiment of a method for calculating the proportional coefficient for the power control.

FIG. 8 shows the corresponding variant for 60 Hz as a constant value of the generator frequency $f_{G,stat}$ according to equation (37). The corresponding factor in this case is 250/Π.

A method for closed-loop control of the power assembly 1 includes in particular the step of detecting the generator power $P_G$ of the generator 9 as a controlled variable, also the step of ascertaining the control deviation $e_P$ as the difference between the detected generator power $P_G$ and the target generator power $P_{target}$, determining the target torque $M_{target}$ as a manipulated variable for actuating the internal combustion engine 5 as a function of the control deviation $e_P$, and finally the step of selecting the control rule used to determine the target torque $M_{target}$ as a function of the predetermined loop gain $v^P$.

Figure 9:
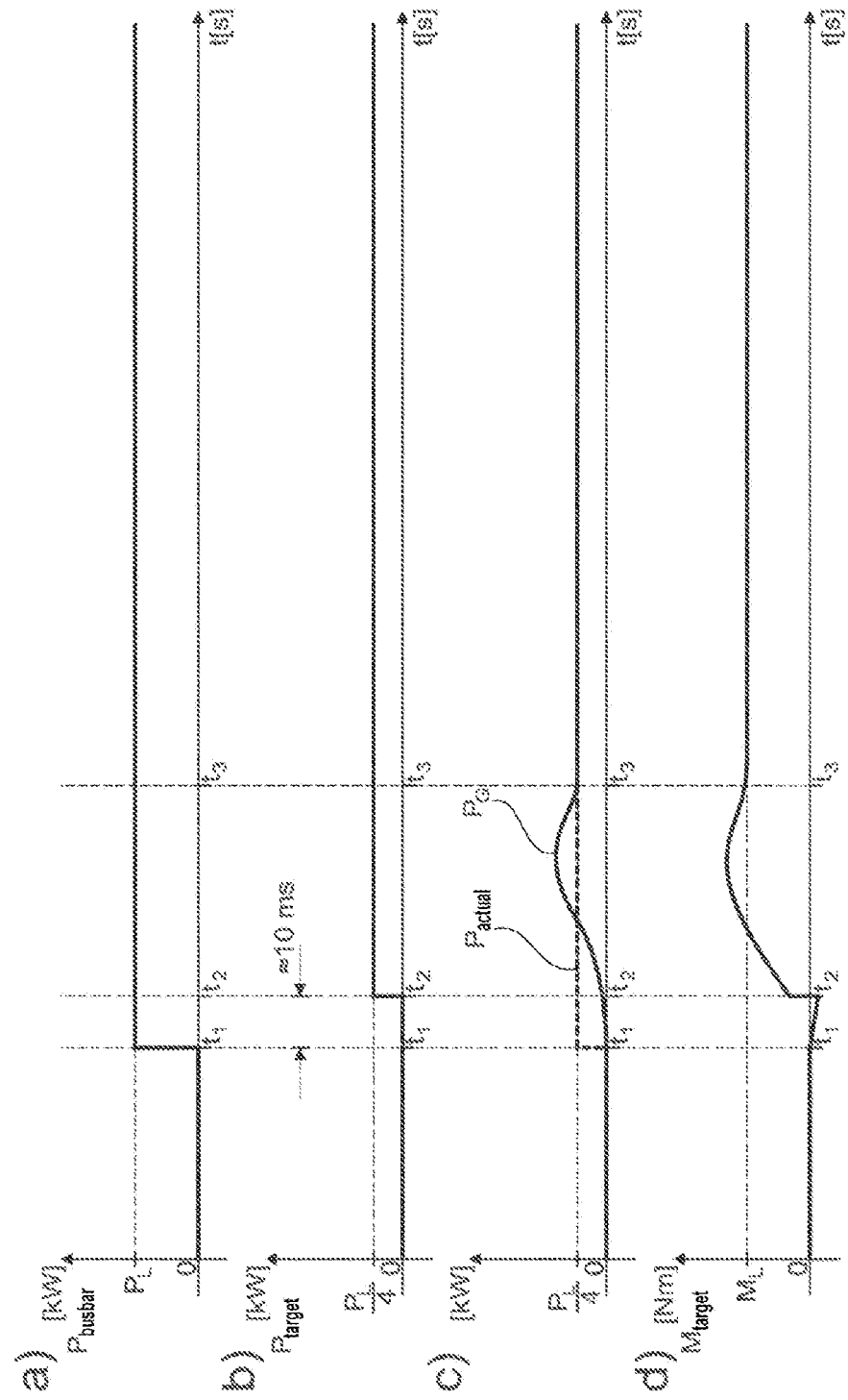
FIG. 9 shows a schematic, diagrammatic illustration of the mode of operation of a method for closed-loop control of a power assembly.

FIG. 9 shows a schematic, diagrammatic illustration of the method. A first timing graph in a) shows the total power $P_{busbar}$ measured on the busbar 6. This is identical to the value 0 kW at a first time $t_1$. The total power $P_{busbar}$ changes suddenly at the first time $t_1$ to a particular value $P_L$ and subsequently remains at this value.

A second timing graph in b) shows the target generator power $P_{target}$ which is transferred from the external open-loop control unit 8 to the closed-loop control device 3. Since the target generator power $P_{target}$ is calculated in the external open-loop control unit 8, there is a time delay until the target generator power $P_{target}$ is available in the closed-loop control device 3. For the purposes of clarification and substantiation, it is assumed here that four identical power assemblies 1 are operated in island parallel operation, wherein the total power $P_{busbar}$ is intended to be distributed uniformly across all four power assemblies 1. For this reason, the target generator power $P_{target}$ increases suddenly at a second time $t_2$ to a value $P_L/4$ and subsequently remains identical to this value. The time delay between the first time $t_1$ and the second time $t_2$ is optionally two sampling steps, that is to say, with a sampling time of 5 ms, a total time period of 10 ms.

A third timing graph in c) shows two curves: a first, dashed curve shows the instantaneous actual power $P_{actual}$ generated by the individual generator 9 of the individual power assembly 1. Since the total power $P_{busbar}$ has to be provided by the generators 9 of the four power assemblies 1 together in equal proportions, the actual power $P_{actual}$ increases—again at the first time $t_1$—suddenly to the value $P_L/4$. A second, solid curve shows the detected generator power $P_G$ obtained by filtering from the actual power $P_{actual}$. Since the detected generator power $P_G$ is the output variable of a filter, it increases—starting from the first time $t_1$—with a time delay and is adjusted to the value $P_L/4$ at a third time $t_3$.

A fourth timing graph in d) shows the target torque $M_{target}$ as manipulated variable of the power control loop. The target generator power $P_{target}$ is identical to 0 kW between the first time $t_1$ and the second time $t_2$. Over this time period, the detected generator power $P_G$ increases slightly so that a negative control deviation $e_P$ results as the difference between the detected generator power $P_G$ and the target generator power $P_{target}$. This leads to the target torque $M_{target}$ being negative and decreasing slightly. Since the target generator power $P_{target}$ increases suddenly at the second time $t_2$ to a value greater than the detected generator power $P_G$ at this time, the result is a sudden change in the control deviation $e_P$ to a positive value, such that the target torque $M_{target}$ correspondingly also increases suddenly. The target torque $M_{target}$ continues to increase and is finally adjusted to a steady value $M_L$ at the third time $t_3$.

The timing diagrams show that the closed-loop control of the generator power is possible in particular when it is delayed with the aid of a filter. Without this filtering, the detected generator power $P_G$ would be identical to the actual power $P_{actual}$ at each time. There would then be a control deviation $e_P$ which is likewise negative but significantly greater in terms of magnitude between the first time $t_1$ and the second time $t_2$, with the result that the target torque $M_{target}$ would assume a value which is negative but significantly greater in terms of magnitude at the second time $t_2$. From the second time $t_2$, the detected generator power $P_G$—and correspondingly the actual power $P_{actual}$—would then be identical to the target power $P_{target}$, and the control deviation $e_P$ would therefore be identical to 0 kW. As a result, the target torque $M_{target}$ would remain at the negative value existing at the second time $t_2$. The energization durations calculated from the target torque $M_{target}$ would be identical to zero, with the result that the injectors or fuel injection valves of the internal combustion engine 5 would not be energized. There would therefore be no fuel supply and therefore the generator power would not be able to undergo closed-loop control.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A control system that includes a closed-loop control device for closed-loop control of a power assembly including an internal combustion engine and a generator operatively connected in terms of drive to the internal combustion engine, the control system comprising:
    a sensor configured for detecting a generator power ($P_G$) of the generator and for outputting a generator power signal associated with the generator power ($P_G$) that is detected; and
    the closed-loop control device which is configured for:
        receiving the generator power signal from the sensor, the generator power ($P_G$) which is detected of the generator serving as a controlled variable;
        ascertaining a control deviation ($e_P$) as a difference between the generator power ($P_G$) which is detected and a target generator power ($P_{target}$);
        determining a target torque ($M_{target}$) as a manipulated variable for actuating the internal combustion engine as a function of the control deviation ($e_P$);
        using a control rule to determine the target torque ($M_{target}$); and
        determining the control rule used to determine the target torque ($M_{target}$) as a function of a predetermined loop gain ($v^P$);
        being operatively connected in terms of drive with an open-loop control device in order for the open-loop control device to directly actuate the internal combustion engine; and
        transferring the target torque ($M_{target}$) generated as the manipulated variable to the open-loop control device.

2. The closed-loop control device according to claim 1, wherein the closed-loop control device is configured for adapting the control rule as a function of at least one adaptation variable, wherein the at least one adaptation variable is selected from a group consisting of the generator power ($P_G$) which is detected, a target torque variable, and a generator frequency ($f_G$).

3. The closed-loop control device according to claim 2, wherein the closed-loop control device is configured for adapting the control rule by virtue of a proportional coefficient ($k_p^P$) of the control rule being determined such that a predetermined loop gain ($v^P$) is constant.

4. The closed-loop control device according to claim 3, wherein the closed-loop control device is configured for determining the proportional coefficient ($k_p^P$) as a function of the generator power ($P_G$) which is detected and the target torque variable.

5. The closed-loop control device according to claim 3, wherein the closed-loop control device is configured for determining the proportional coefficient ($k_p^P$) only as a function of the generator frequency ($f_G$).

6. The closed-loop control device according to claim 3, wherein the closed-loop control device is configured for setting the generator frequency ($f_G$) to be constant in order to determine the proportional coefficient ($k_p^P$).

7. The closed-loop control device according to claim 1, wherein the closed-loop control device is configured for filtering an actual power ($P_{actual}$)—which is instantaneous—of the generator and to use the actual power ($P_{actual}$)—which is filtered—as the generator power ($P_G$) which is detected.

8. The closed-loop control device according to claim 1, wherein the closed-loop control device is formed as a generator controller.

9. The closed-loop control device according to claim 1, wherein the closed-loop control device is formed as a generator controller with an interface to an open-loop control device of the internal combustion engine.

10. The closed-loop control device according to claim 1, wherein the closed-loop control device does not have or produce any secondary speed control.

11. The closed-loop control device according to claim 10, wherein the closed-loop control device does not have or produce any speed specification for the internal combustion engine.

12. A closed-loop control arrangement for closed-loop control of a power assembly including an internal combustion engine and a generator operatively connected in terms of drive to the internal combustion engine, the closed-loop control arrangement comprising:
   a closed-loop control device which is formed as a generator controller, is for closed-loop control of the power assembly, and is configured for:
      detecting a generator power ($P_G$) of the generator as a controlled variable;
      ascertaining a control deviation ($e_P$) as a difference between the generator power ($P_G$) which is detected and a target generator power ($P_{target}$);
      determining a target torque ($M_{target}$) as a manipulated variable for actuating the internal combustion engine as a function of the control deviation ($e_P$);
      using a control rule to determine the target torque ($M_{target}$); and
      determining the control rule used to determine the target torque ($M_{target}$) as a function of a predetermined loop gain ($v^P$); and
   an open-loop control device, which is operatively connected in terms of drive to the closed-loop control device, in order to directly actuate the internal combustion engine, the closed-loop control device being configured for transferring the target torque ($M_{target}$) generated as the manipulated variable to the open-loop control device.

13. The closed-loop control arrangement according to claim 12, wherein the open-loop control device: (a) does not have a speed controller; (b) includes a speed controller which is deactivated; or (c) includes a final idling speed controller which is activated.

14. A power assembly, comprising:
   an internal combustion engine;
   a generator operatively connected in terms of drive to the internal combustion engine;
   one of:
      (a) a closed-loop control device for closed-loop control of the power assembly, the closed-loop being configured for:
         detecting a generator power ($P_G$) of the generator as a controlled variable;
         ascertaining a control deviation ($e_P$) as a difference between the generator power ($P_G$) which is detected and a target generator power ($P_{target}$);
         determining a target torque ($M_{target}$) as a manipulated variable for actuating the internal combustion engine as a function of the control deviation ($e_P$);
         using a control rule to determine the target torque ($M_{target}$); and
         determining the control rule used to determine the target torque ($M_{target}$) as a function of a predetermined loop gain ($v^P$); and
      (b) a closed-loop control arrangement for closed-loop control of the power assembly, the closed-loop control arrangement including:
         a closed-loop control device which is formed as a generator controller, is for closed-loop control of the power assembly, and is configured for:
            detecting a generator power ($P_G$) of the generator as a controlled variable;
            ascertaining a control deviation ($e_P$) as a difference between the generator power ($P_G$) which is detected and a target generator power ($P_{target}$);
            determining a target torque ($M_{target}$) as a manipulated variable for actuating the internal combustion engine as a function of the control deviation ($e_P$);
            using a control rule to determine the target torque ($M_{target}$); and
            determining the control rule used to determine the target torque ($M_{target}$) as a function of a predetermined loop gain ($v^P$); and
         an open-loop control device, which is operatively connected in terms of drive to the closed-loop control device, in order to directly actuate the internal combustion engine, the closed-loop control device being configured for transferring the target torque ($M_{target}$) generated as the manipulated variable to the open-loop control device;
      wherein the closed-loop control device or the closed-loop control arrangement is operatively connected to the internal combustion engine and the generator of the power assembly.

15. A method for closed-loop control of a power assembly, the method including using a control system including a closed-loop control device, the power assembly including an internal combustion engine and a generator operatively connected in terms of drive to the internal combustion engine, the method comprising the steps of:
   detecting, by way of a sensor of the control system, a generator power ($P_G$) of the generator, the sensor outputting a generator power signal associated with the generator power ($P_G$) that is detected;
   receiving, by way of the closed-loop control device of the control system, the generator power signal from the sensor, the generator power ($P_G$) which is detected of the generator serving as a controlled variable;
   ascertaining, by way of the closed-loop control device, a control deviation ($e_P$) as a difference between the generator power ($P_G$) which is detected and a target generator power ($P_{target}$);
   determining, by way of the closed-loop control device, a target torque ($M_{target}$) as a manipulated variable for actuating the internal combustion engine as a function of the control deviation ($e_P$);
   using, by way of the closed-loop control device, a control rule to determine the target torque ($M_{target}$);
   determining, by way of the closed-loop control device, the control rule used to determine the target torque ($M_{target}$) as a function of a predetermined loop gain ($v^P$); and
   transferring, by way of the closed-loop control device, the target torque ($M_{target}$) generated as the manipulated variable to an open-loop control device, the open-loop control device being operatively connected in terms of drive to the closed-loop control device in order for the open-loop control device to directly actuate the internal combustion engine.

* * * * *